(12) United States Patent
Ammons

(10) Patent No.: US 8,336,252 B1
(45) Date of Patent: Dec. 25, 2012

(54) ROOT BALL AND TREE STABILIZING SYSTEM

(76) Inventor: James Ammons, Kemah, TX (US)

( * ) Notice: Subject to any disclaimer, the term of this patent is extended or adjusted under 35 U.S.C. 154(b) by 0 days.

(21) Appl. No.: 13/153,070

(22) Filed: Jun. 3, 2011

Related U.S. Application Data

(60) Provisional application No. 61/351,418, filed on Jun. 4, 2010.

(51) Int. Cl.
*A01G 17/04* (2006.01)

(52) U.S. Cl. ............................ 47/42; 47/43

(58) Field of Classification Search ............ 47/42, 43, 47/44, 46, 47, 32.4, 32.5, 32.6; 248/524–529, 248/519–522, 511
See application file for complete search history.

(56) References Cited

U.S. PATENT DOCUMENTS

| | | | | |
|---|---|---|---|---|
| 952,655 A | * | 3/1910 | Wagner | 248/524 |
| 2,501,255 A | * | 3/1950 | Bell | 47/43 |
| 4,073,090 A | * | 2/1978 | Lucia | 47/43 |
| 4,249,342 A | * | 2/1981 | Williams | 47/43 |
| 5,002,252 A | * | 3/1991 | Setala et al. | 248/533 |
| 5,199,214 A | * | 4/1993 | Caldwell | 47/42 |
| 6,370,817 B1 | * | 4/2002 | Brooks et al. | 47/43 |
| 6,389,743 B1 | * | 5/2002 | Stephenson | 47/43 |
| 6,612,071 B1 | * | 9/2003 | Steadman | 47/42 |
| 2002/0078624 A1 | * | 6/2002 | Saxon et al. | 47/42 |
| 2008/0072487 A1 | * | 3/2008 | Lammers | 47/42 |
| 2009/0119984 A1 | * | 5/2009 | Nabhan | 47/43 |

* cited by examiner

*Primary Examiner* — T. Nguyen
(74) *Attorney, Agent, or Firm* — Buskop Law Group, PC; Wendy Buskop

(57) ABSTRACT

A deep root watering and stabilization assembly and method for supporting, irrigating, and fertilizing plantings, such as trees, shrubs, or root balls is described herein. The assembly can include a harness disposed around the planting and a perforated tube adapted to receive water and nutrients from above the surface and pass the water and nutrients to the roots or root ball. The assembly can include an attachment assembly with adjustable engagement locations and a fastener affixed to the attachment assembly. The fastener can be structured to tighten or loosen a first connector as it engages one of a plurality of positions between the harness and the perforated tube.

19 Claims, 5 Drawing Sheets

ROOT BALL AND TREE STABILIZING SYSTEM

CROSS REFERENCE TO RELATED APPLICATIONS

The present application claims priority to and the benefit of U.S. Provisional Application Ser. No. 61/351,418 filed on Jun. 4, 2010, entitled "ROOT BALL AND TREE STABILIZING SYSTEM". This reference is hereby incorporated in its entirety.

FIELD

The present embodiments generally relate to a combination support, irrigator, and fertilizer for a planting, such as a tree, a shrub, or a root ball.

BACKGROUND

When a planting is transplanted, the planting includes a root ball. The root ball is positioned within a hole in the ground. Often the root ball does not get enough water, gets over watered, or does not get adequate fertilizer to grow downwardly into the soil. Planting also often needs support, such as support for a tree.

A need exists for a device that can secure a planting to the ground using a plurality of stakes.

A need exists for a device that can provide water, oxygen, and nutrients, while allowing simultaneous monitoring of a root status of the planting.

The present embodiments meet these needs.

DETAILED DESCRIPTION OF THE EMBODIMENTS

Figure 1:
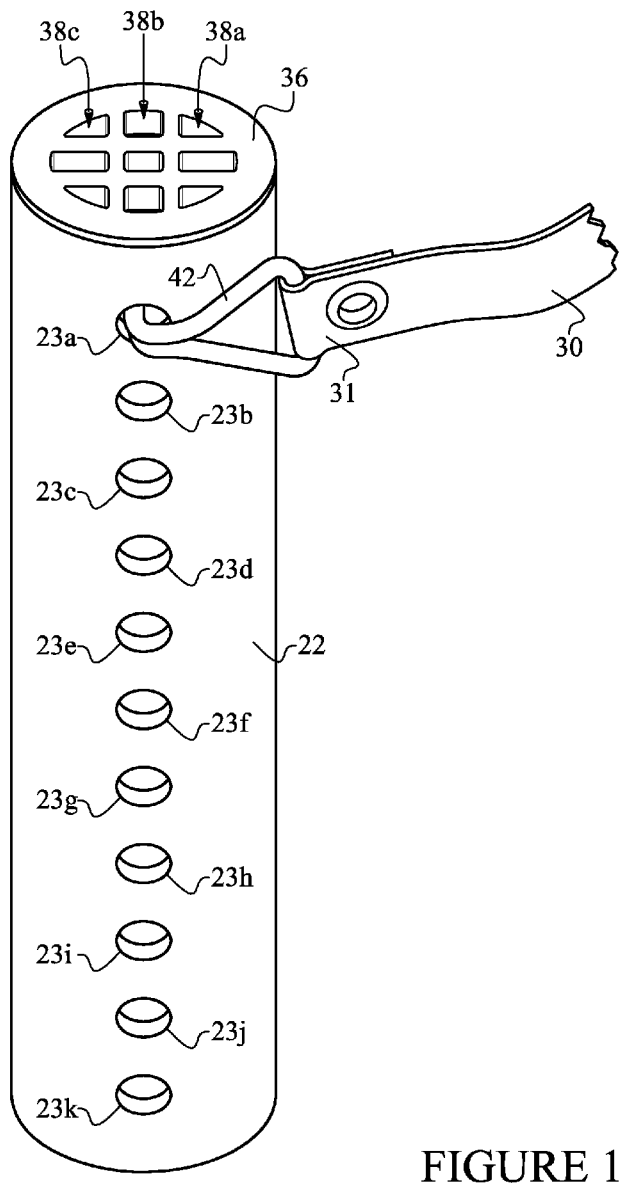
FIG. 1 is a front perspective view of a perforated tube.

Before explaining the present apparatus in detail, it is to be understood that the apparatus is not limited to the particular embodiments and that it can be practiced or carried out in various ways.

The present embodiments relate to a deep root, shrub, and tree stabilizing system that can include a perforated tube.

The stabilizing and water system can be ecologically friendly. For example, the stabilizing and water system can save water loss during irrigation or rain fall by collecting water into the perforated tube. The use of a plurality of perforated tubes around a tree or shrub can control water run off and conserve water.

One or more embodiments can be used to prevent shallow growth roots, which can cause trees to tip over in storms. Embodiments can be used to encourage deep root growth, while simultaneously stabilizing trees and shrubs.

One or more embodiments relate to a deep root watering and stabilization assembly designed to provide aeration for a tree, a shrub, or a root ball, while the trees and shrubs are stabilized in a substantially upright position.

The assembly can include a removable adjustable harness for attaching around a tree, a shrub, or over a root ball. The removable adjustable harness can be made from seat belt material and can include a reinforcing cable, a plurality of loops, or other adjustable engagement locations connected to the harness.

The removable adjustable harness can encircle the tree and can be adjustable and reusable, such that the harness can connect to a tree. As the tree grows, the harness can be made larger to adapt to the size of the growing tree. Once the tree is strong enough to stabilize itself without the harness, the harness can be removed and attached to another tree.

In embodiments, the removable adjustable harness can have ratchets for tightening the removable adjustable harness around the tree or shrub. In embodiments, the removable adjustable harness can include an encircling cable that surrounds a tree or a shrub for supporting a grommet or carabineer. The harness can be a durable and weather-resistant material, such as a flexible polypropylene, polyethylene, homopolymer, copolymer, or combinations thereof.

The perforated tube can have a diameter that ranges from about 0.5 inches to about 5 inches. The perforated tube can have a wall thickness that corresponds to or directly matches the thickness of Schedule 200 pipe, Schedule 60 pipe, or a thickness between the thickness of Schedule 200 pipe and Schedule 60 pipe.

The perforated tube can be from about twelve inches to about forty eight inches long. In embodiments, the perforated tube can be made from PVC, also known as poly vinyl chloride. The perforated tube can be formed from a biodegradable material, such as reinforced paper. The perforated tube can be made from steel, non-deforming plastic, reinforced composite, a laminate of plastic and metal, a biodegradable rigid material, a rigid paper, or combinations thereof.

In embodiments, at least one perforated tube can be used. Each perforated tube can be connected to the harness at a different position.

The perforated tube can be positioned at an angle from about 45 degrees to about 100 degrees to a plane of the dirt, earth, or other surface in which the tree, shrub, or root ball has been installed.

When the perforated tube is buried in the soil near the tree, shrub, or root ball, about 80 percent of the installed perforated tube can be positioned beneath the surface and "planted" in the earth or other material. The remaining 20 percent of the installed perforated tube can remain exposed above the earth or other material.

Numerous holes or "perforations" can be formed in the perforated tube. The perforated tube can have parallel perforations, perforations in groups along the tube, or perforations in a helical arrangement. The perforated tube can have from about three holes to about eight holes per inch, with hole diameters ranging from about $\frac{1}{16}^{th}$ of an inch to about 2 inches.

In embodiments, the holes of the perforated tube can be aligned to allow a rod to pass through at least two perforations simultaneously. The rod can enable the perforated tube to be lifted out of the earth or from beneath the surface with ease.

The device can be used to feed the root ball, tree, or shrub. For example, a central annulus of the perforated tube can receive water, nutrients, fertilizer, or combinations thereof from above the surface, and pass that water, nutrients, fertilizer, or combinations to a root ball or deep root below the ground. The feeding of the root ball, tree, or shrub can be performed as a periodic treatment of the root ball, tree, or shrub, allowing maximum growth in the shortest amount of time without the need to dig extra holes. The device can be used to feed the root ball, tree, or shrub, while simultaneously allowing the tree or shrub to be supported.

In embodiments, the perforated tube can have a tapered nose that can be tapered to a point on one end. The nose can be tapered to a point or tapered to a flat plane, allowing easier penetration into hard or dense soils. The perforated tube can have an anvil end opposite the pointed nose for providing additional support during installation of the perforated tube into the surface of the ground.

Long tubes can be used to hold the tree upright. The long tubes can be about three feet long. For example, when a tree is planted in sandy soil, the long tubes can be useful in providing stability to the tree. If a tree is planted in hard soil, long narrow perforated tubes, such as tubes with a small diameter of about two inches, can be used to provide stability to the tree.

Tall trees can have root balls that are embedded deeper into the soil then small trees. Tall trees can require oxygen and nutrients to be provided far deeper into the ground than smaller and shorter trees. In one or more embodiments, long perforated tubes, such as tubes at least two feet long, can be used to stabilize large or tall trees, such as trees that are at least one story tall.

The perforated tubes can provide oxygen to deep roots of trees and to newly planted root balls. In addition, the perforated tubes can enable fertilizer to be easily provided into a root ball or to deep roots from the surface without having to dig new holes to the roots for each application of fertilizer. The fertilizer can be provided at periodic intervals.

In embodiments, the perforated tube can have a protective cap with at least one opening or a plurality of openings. The opening can be in fluid communication with an interior of the perforated tube, which allows at least minimal airflow and water to fall into the perforated tube to reach the roots of the tree, shrub, or root ball.

The opening of the protective cap can be used to monitor and observe the health and status of a root ball, such as how soggy the root ball appears to be. For example, a worker can look down the opening in the cap and view the root ball to asses the status and health of the planting, such as whether or not the root ball is covered in water. The opening in the cap can also allow air to pass through to and from the root ball.

In embodiments, the cap can be removable from the tube, allowing for easy pouring of liquid fertilizer, nutrients, water, combinations thereof or other substances to the root ball. Using the protective cap on a top of the perforated tube can prevent debris from entering the perforated tube and can keep a root ball cleaner.

One or more embodiments can utilize a fastener to connect between the perforated tube and a tree or shrub. The fastener can be produced in different colors for safety. The fastener can engage at least one connector, which can be a web material, such as a seat belt web material or a dog leash web material. The web material can be printed, enabling the tree support and irrigation device to be a marketing tool while simultaneously irrigating and aerating trees, shrubs, and root balls.

In embodiments, the connector can be easily removable from the harness of the device, and the harness can be easily removable from the tree, allowing a user to easily engage the tree during a hurricane or storm and to quickly release and disengage the tree after the hurricane or storm. For safety, the connector can be made of fluorescent day-glow colors for use in playgrounds, so that children will not run and trip over the connector.

One or more embodiments can include stakes that do not have to be made of metal. Without metal stakes, the device can avoid attracting lightening. This allows for a reduction of fire hazards around trees and shrubs, particularly in arid areas.

The device can include an attachment assembly. The attachment assembly can be made of a first connector that removably engages with one of the holes of one of the perforated tubes. The attachment assembly can include a second connector for removable attachment to at least one of the adjustable engagement locations of the harness.

The device can include a cinch or another similar fastener. The cinch or fastener can be affixed to the attachment assembly. The fastener or cinch can be structured to tighten or loosen the first connector as it engages one of a plurality of positions between the harness and the perforated tube. The fastener or cinch can allow for support of the tree or shrub, while providing a conduit to flow nutrients and water to the roots.

In embodiments, the attachment assembly can have a first hook attached to the first connector on a first end for engaging at least one of the holes of the perforated tube. The fastener can attach to the first connector on a second end, and a second hook can attach to a second connector on a second connector first end.

The second connector can attach to the fastener on the second connector second end, which enables the second hook to engage the removable adjustable harness.

In embodiments, the first connector and the second connector can be a cable, such as twisted wire cable of about ¼ inch in diameter.

In embodiments, the attachment assembly can have a first hook attached to a cable on a first cable end for engaging at least one of the holes of the perforated tube. The cable can extend from the perforated tube to the removable adjustable harness, passing through a releasable ring secured to the harness and then passing to an adjustable cable clamp. The adjustable cable clamp can be used for tightening or loosening the cable.

The first hook of the attachment assembly can be secured to the connector for removably engaging a hole of the perforated tube to the harness and then adjustably reattaching to an integral fastener on the connector. The connector can be flat, flexible, durable, impact-resistant, non-stretching, biodegradable, polymeric, or combinations thereof.

The adjustable engagement locations can be a carabineer, a grommet, or combinations thereof. The adjustable engagement locations can be disposed on the harness.

In embodiments, the adjustable engagement assembly can have a first adjustable coupling attached on one side of the webbing material that adjustably engages the perforated tube on the other side.

In embodiments wherein a cinch is used as the fastener, the body of the cinch can be formed with an integral hook as a one-piece unit, for engaging the perforated tube.

In embodiments, the perforated tube can act as a packaging and contain each element of the device. The perforated tube can contain the harness, the connector, the fasteners, and all other parts of the device. This can reduce waste and provide a more environmentally friendly product when compared to other products that use glassine, plastic packaging, or large cardboard containers. The device can be shipped and sold with all parts of the device being contained within the perforated tube.

One or more embodiments further relate to a method for stabilizing deep roots of a tree, a shrub, or a root ball.

The method can include installing a perforated tube through a surface adjacent a tree, shrub, or a root ball.

The method can include connecting a first hook that engages a connector of an attachment assembly to a hole in the perforated tube.

The method can include installing a harness around the tree, shrub, or root ball.

The method can include connecting a second hook. The second hook can engage a connector end to the harness.

The method can include tightening or loosening the connector as the connector engages one of a plurality of positions between the harness and the perforated tube.

Turning now to the Figures, FIG. 1 is a front perspective view of a perforated tube 22.

The perforated tube 22 can have somewhat equidistantly spaced perforations 23a, 23b, 23c, 23d, 23e, 23f, 23g, 23h, 23i, 23j, and 23k.

A removable protective cap 36 can have a plurality of cap openings 38a, 38b, and 38c disposed over the perforated tube 22.

A first hook 42 can be removably attached to the perforation 23a. The first hook 42 can be non-removably connected to a first connector 30 on a first connector first end 31 of an attachment assembly.

Figure 2:
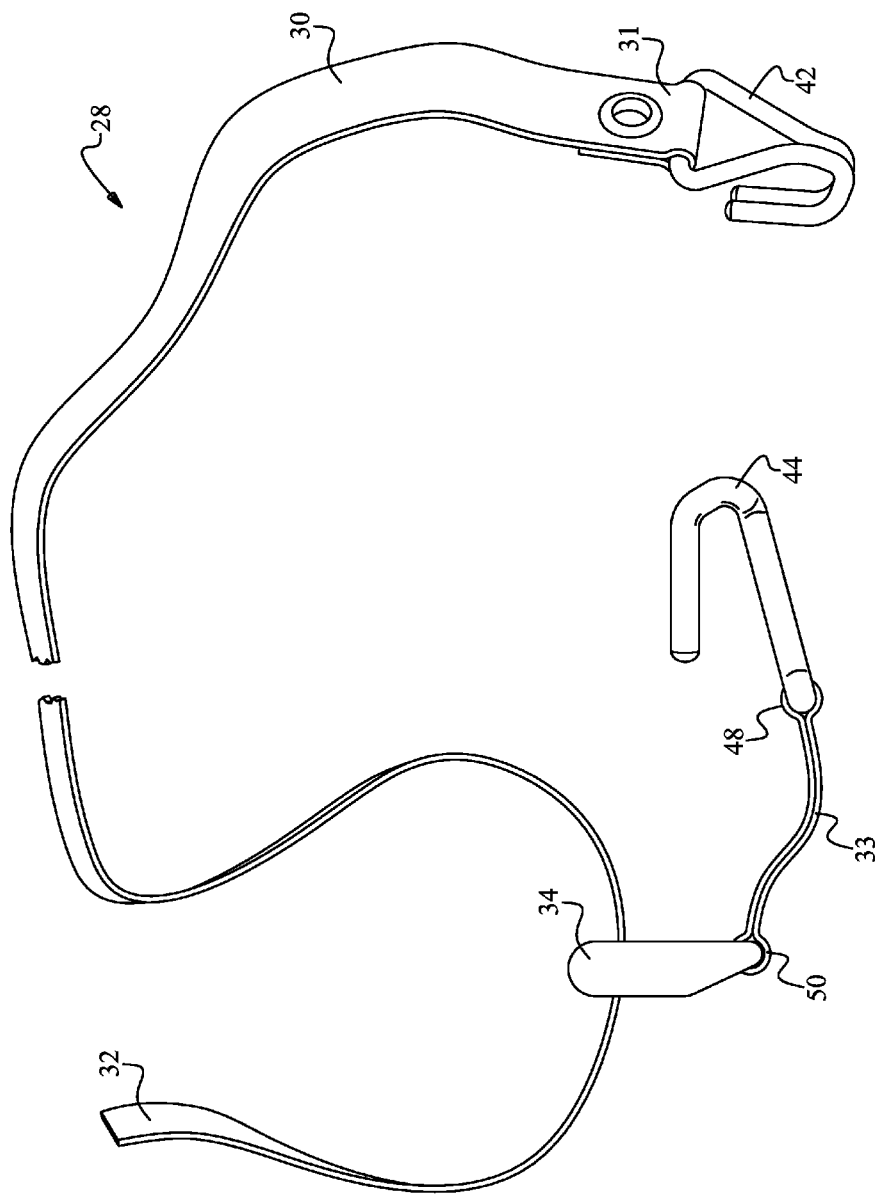
FIG. 2 is view of an adjustment assembly.

FIG. 2 shows the attachment assembly 28 having a first hook 42 secured to a first connector 30 on a first connector first end 31, and a second hook 44 secured to a second connector 33 on a second connector first end 48.

The first connector 30 can pass through a fastener 34. The first connector second end 32 of the first connector can be used to tighten or loosen the first connector 30.

The second connector 33 can have a second connector second end 50 that can be non-removably attached to the fastener 34. The first connector 30 can be a cable. The fastener 34 can be a cinch. The cinch can be an adjustable cable clamp. The first and second hooks can be releasable rings.

The first hook 42 can engage the perforated tube 22, while the second hook 44 can engage the harness around the planted item.

Figure 3:
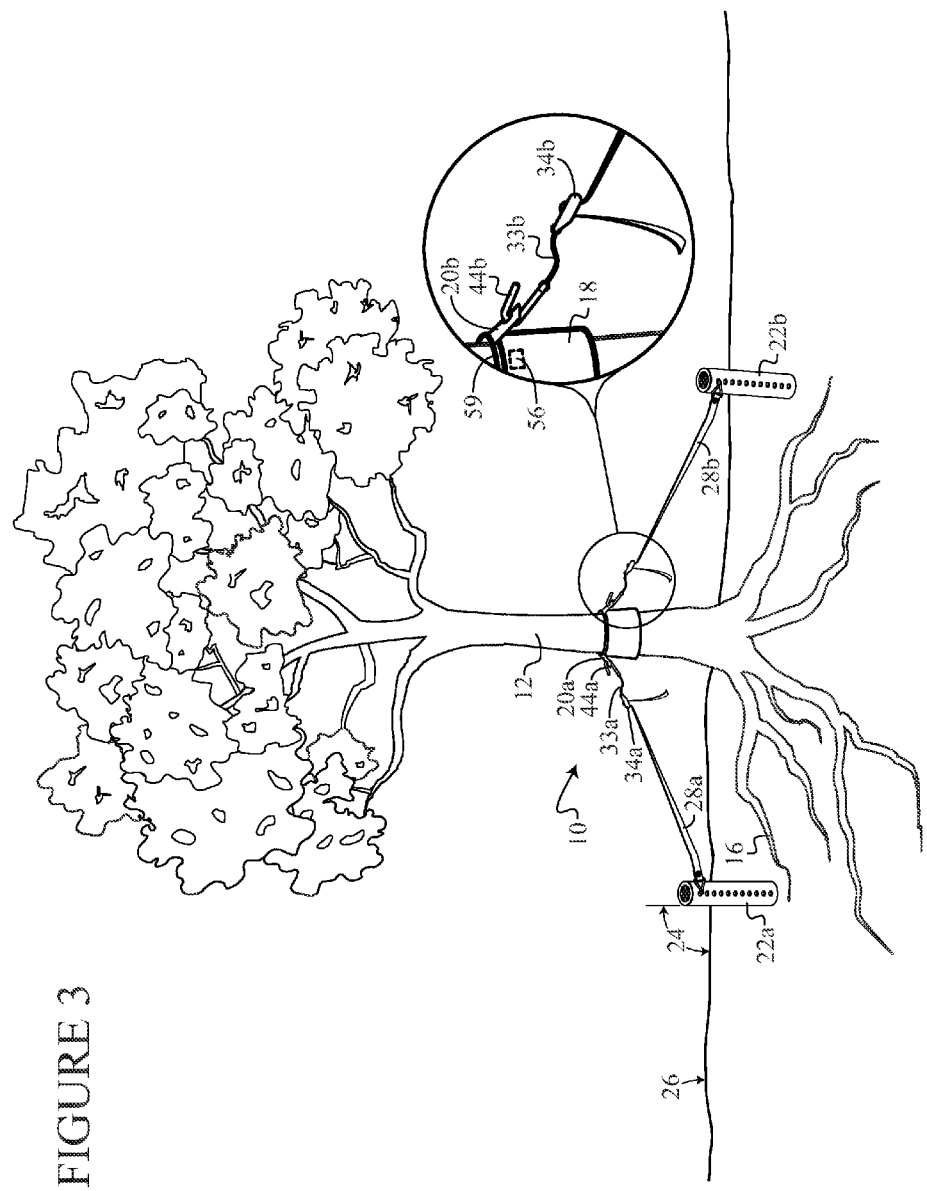
FIG. 3 is a view of a tree with a harness, adjustment assemblies, and perforated tubes.

FIG. 3 shows the deep root watering and stabilization assembly 10 attached to a removable adjustable harness 18. The deep root watering and stabilization assembly 10 is shown connected around a tree 12 with a root ball 16. The removable adjustable harness 18 can also fit around a shrub or bush in a similar manner.

The removable adjustable harness 18 can have a plurality of adjustable engagement locations 20a and 20b. Each of the adjustable engagement locations 20a and 20b can be used to attach to the attachment assemblies 28a and 28b using the second hook 44a and 44b attached to the second connector 33a and 33b.

The plane of a surface 26 is shown adjacent the tree 12 and can form an angle 24 with the perforated tube 22a. The angle can be about 90 degrees, so that rain can fall into the perforated tube 22a and 22b or fertilizer can be poured into the perforated tube 22a and 22b.

An encircling cable 59 can be used in the removable adjustable harness 18 to provide additional strength and support for large trees or tall trees.

The removable adjustable harness 18 can have an additional ratchet 56 for tightening the removable adjustable harness 18 around the tree 12.

Also shown in FIG. 3 are fasteners 34a and 34b.

Figure 4:
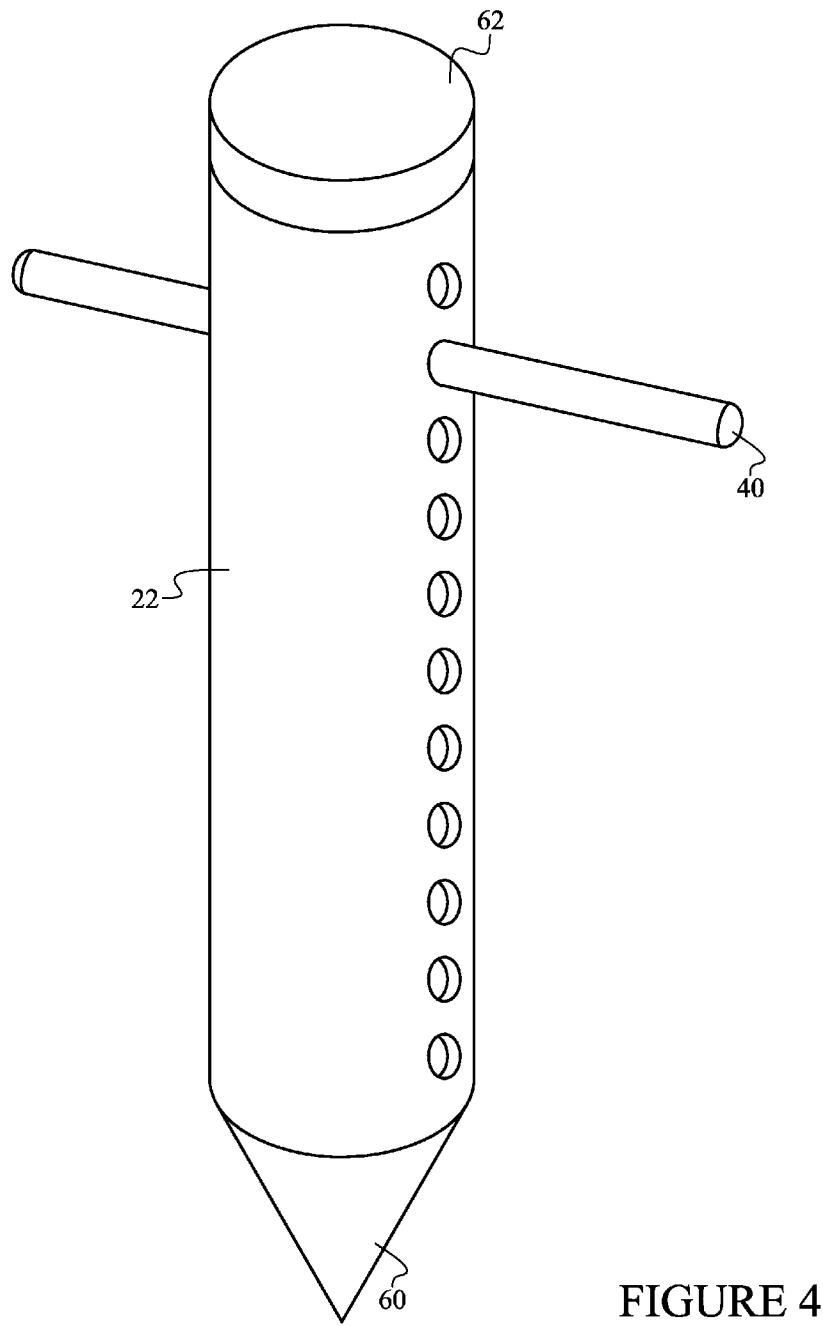
FIG. 4 is another embodiment of the perforated tube.

FIG. 4 is another embodiment of the perforated tube 22.

In operation, to lift the perforated tube 22 from the ground, a rod 40 can be inserted into the perforated tube 22, and the perforated tube 22 can be pulled from the ground.

The perforated tube 22 can have a nose 60, which can taper to a point or a flat plane. The perforated tube 22 can have an anvil end 62.

Figure 5:
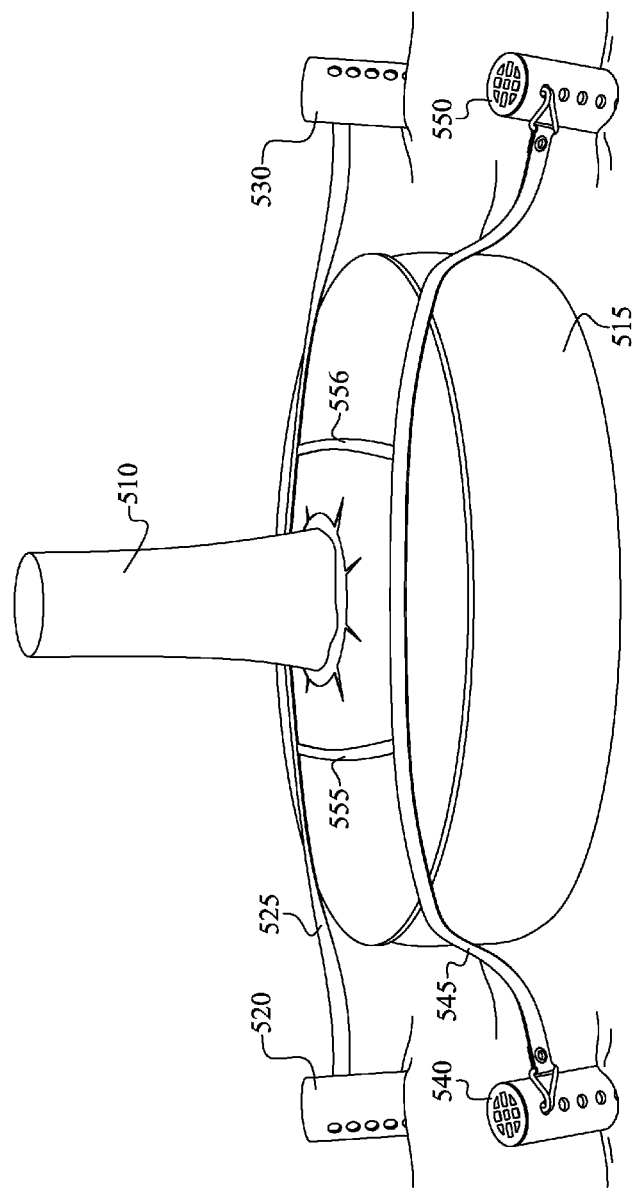
FIG. 5 depicts embodiments of a set of perforated tubes holding a harness about the root ball of a tree.

FIG. 5 depicts an embodiment of a harness system disposed about a root ball 515 of a tree 510. The harness system can include one or more perforated tubes (four are shown including 520, 530, 540, and 550), and one or more straps (four are shown including 525, 545, 555, and 556).

To form the harness system, the first strap 525 can be disposed about a portion of the root ball 515. The first strap 525 can be connected at one end to the first perforated tube 520. The first strap 525 can be connected at another end to the second perforated tube 530.

The second strap 545 can be disposed over another portion of the root ball 515. The second strap 545 can be connected at one end to the third perforated tube 540. The second strap 545 can be connected at another end to the fourth perforated tube 550.

The third strap 555 can be disposed about a portion of the root ball 515. The third strap 555 can be connected to the first strap 525. The third strap 555 can be connected to the second strap 545.

The fourth strap 556 can be disposed over another portion of the root ball 515. The fourth strap 556 can be connected to the first strap 525. The fourth strap 556 can be connected to the second strap 545.

While these embodiments have been described with emphasis on the embodiments, it should be understood that within the scope of the appended claims, the embodiments might be practiced other than as specifically described herein.

What is claimed is:

1. A deep root watering and stabilization assembly designed to provide aeration for a tree, a shrub, or a root ball, the assembly comprising:
   a. a removable adjustable harness configured to support a tree or shrub, wherein the removable adjustable harness comprises a plurality of adjustable engagement locations;
   b. at least one perforated tube comprising a plurality of holes;
   c. an attachment assembly comprising a first connector for removable engagement with one of the plurality of holes and a second connector for removable engagement to at least one of the plurality of adjustable engagement locations; and
   d. a fastener affixed to the attachment assembly, wherein the fastener is structured to tighten or loosen the first connector between the removable adjustable harness and the at least one perforated tube.

2. The assembly of claim 1, further comprising a protective cap engaged on an end of the at least one perforated tube, wherein the protective cap comprises cap openings to allow air and water to flow into the at least one perforated tube to reach the root of the tree, the root of the shrub, or the root ball.

3. The assembly of claim 1, wherein the at least one perforated tube is a member of the group consisting of: a polyvinyl chloride perforated tube, a steel perforated tube, a non-deforming plastic perforated tube, a reinforced composite perforated tube, a laminate of plastic and metal perforated tube, and combinations thereof.

4. The assembly of claim 1, wherein the plurality of holes are disposed in a helical arrangement on the at least one perforated tube.

5. The assembly of claim 1, wherein the at least one perforated tube comprises from three holes to eight holes per inch, and wherein each hole has a diameter ranging from $\frac{1}{16}^{th}$ of an inch to 2 inches.

6. The assembly of claim 1, wherein the plurality of holes are aligned to allow a rod to pass through at least two of the plurality of holes to allow lifting from the surface of the at least one perforated tube.

7. The assembly of claim 1, wherein the attachment assembly further comprises:
   a. a first hook attached to the first connector on a first end for engaging at least one of the plurality of holes, wherein the fastener attaches to the first connector on a second end; and
   b. a second hook attached to the second connector on a second connector first end, wherein the second connector is attached to the fastener on the second connector second end enabling the second hook to engage the removable adjustable harness.

8. The assembly of claim 7, wherein the first connector and the second connector each comprise a flexible web material, a cable, or combinations thereof.

9. The assembly of claim 1, wherein the attachment assembly further comprises: a first hook attached to a cable on a first cable end for engaging at least one of the plurality of holes, and wherein the cable extends from the at least one perforated tube to the removable adjustable harness, passes through a releasable ring secured to the removable adjustable harness, and passes to an adjustable cable clamp for tightening or loosening the cable.

10. The assembly of claim 1, wherein the attachment assembly further comprises: a first hook secured to the first connector for providing removable engagement between one of the plurality of holes and the removable adjustable harness, and for adjustably reattaching to an integral fastener on the first connector, and wherein the first connector is a flat, flexible, durable, impact-resistant, non-stretching, biodegradable polymer.

11. The assembly of claim 1, wherein the plurality of adjustable engagement locations is selected from the group consisting of: a carabineer disposed on the removable adjustable harness, a grommet disposed on the removable adjustable harness, and combinations thereof.

12. The assembly of claim 1, wherein the removable adjustable harness further comprises ratchets for tightening the removable adjustable harness around the tree or the shrub.

13. The assembly of claim 1, wherein the attachment assembly further comprises: a first adjustable coupling attached on one side of webbing material of the attachment assembly that adjustably engages the at least one perforated tube on an opposite side.

14. The assembly of claim 1, wherein the attachment assembly further comprises a body with an integral hook for engaging the at least one perforated tube.

15. The assembly of claim 1, wherein the at least one perforated tube further comprises a biodegradable rigid material, a rigid paper, or combinations thereof.

16. The assembly of claim 1, wherein the removable adjustable harness further comprises a durable and weather resistant material, a polypropylene, a polyethylene, a homopolymer, a copolymer, or combinations thereof.

17. The assembly of claim 1, wherein the plurality of adjustable engagement locations each comprises a carabineer disposed on the removable adjustable harness or a grommet disposed on the removable adjustable harness, and wherein the removable adjustable harness further comprises an encircling cable surrounding the tree or shrub for supporting the grommet or carabineer.

18. The assembly of claim 1, wherein the at least one perforated tube further comprises a tapered nose for quicker penetration into dense soils.

19. The assembly of claim 1, wherein the at least one perforated tube further comprises an anvil end for providing additional support during installation of the at least one perforated tube into the surface.

* * * * *